Aug. 21, 1956
I. M. FRATES
2,759,370
ATTACHMENT FOR ACCELERATOR PEDALS
Filed Jan. 17, 1955
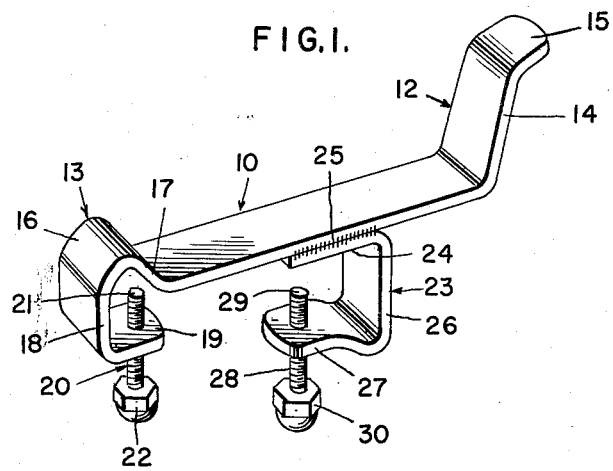
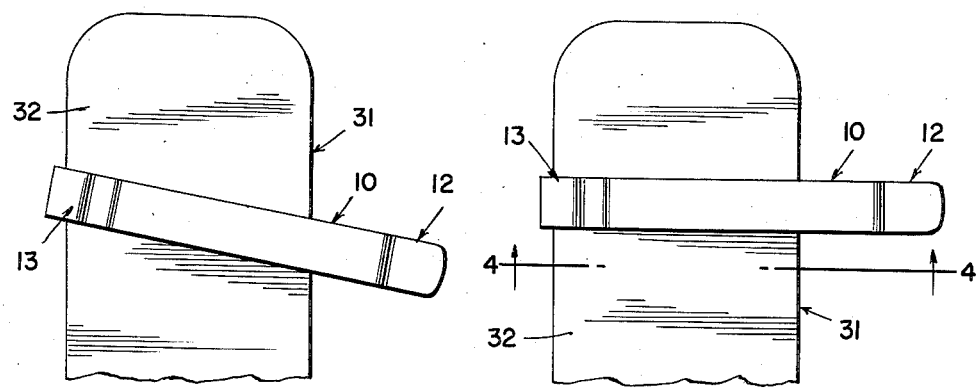
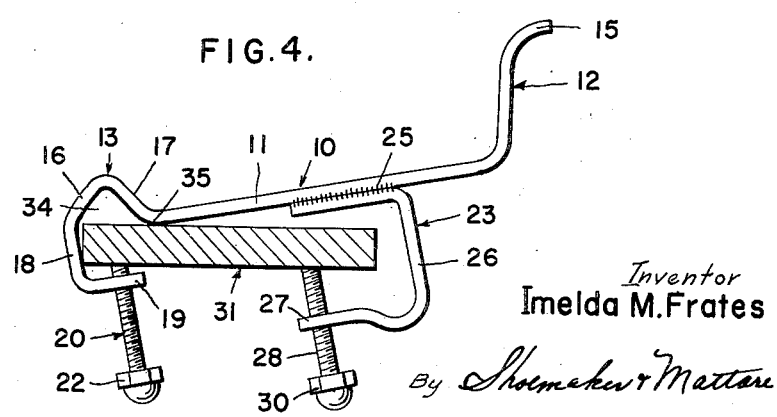
Inventor
Imelda M. Frates
By Shoemaker & Mattare
ATTYS.

United States Patent Office 2,759,370
Patented Aug. 21, 1956

2,759,370

ATTACHMENT FOR ACCELERATOR PEDALS

Imelda M. Frates, New Bedford, Mass.

Application January 17, 1955, Serial No. 482,078

9 Claims. (Cl. 74—562)

This invention relates to a foot rest attachement for accelerator pedals and has for its primary object the provision of a foot rest attachement for accelerator pedals so constructed so as to be readily and easily adjusted on the pedal for accommodating the angle of repose of a driver's foot on the accelerator pedal, the rapidity of the adjustment being particularly useful in permitting the attachment to accommodate different drivers.

Another object of this invention is to provide an accelerator foot rest attachment wherein the portion thereon upon which the operator's foot rests may be pivotally adjusted about one end thereof for raising or lowering the opposite end such that the most comfortable foot position for the operator may be attained.

A further object of this invention resides in the provision of a foot rest attachment for accelerator pedals wherein the attachment is readily swingable with respect to the accelerator pedal to be established in various angular dispositions transversely of the pedal whereby a comfortable foot rest position may be attained. In connection with this object, it is to be realized that various operators or drivers will differently place their right foot upon the accelerator pedal, some resting the heel on the floor adjacent to and to one side of the pedal, some resting their heel adjacent to but rearwardly on the pedal and some placing their entire foot includind the heel portion thereof upon the pedal. Women who have been accustomed to wearing high heel shoes will ordinarily place the heel portion laterally to one side of the pedal while placing the sole portion upon the pedal whereas men usually prefer either one of the two latter positions described. However, in any case, the particular positioning of the foot to which the operator may be accustomed is readily accommodated by the use of the present attachment.

A still further object of this invention is to provide an accelerator pedal foot rest attachment which is permitted of both angular adjustment laterally of an accelerator pedal and an adjustment of one end portion thereof up and down with relation thereto such that the combination of the two adjustments will permit the attachment to readily and comfortably accommodate the particular positioning of an operator's foot.

A still further object of this invention resides in the provision of an accelerator foot rest attachment which may be readily moved longitudinally on the accelerator pedal to be positioned exactly thereon as is required to readily conform with the contour of the operator's shoe.

A still further object of this invention resides in the provision of an improved form of accelerator pedal foot rest attachment which is movable rapidly and easily longitudinally of an associated accelerator pedal, in a direction transverse to the accelerator pedal and vertically with respect to the accelerator pedal at one end thereof such that the combination of such movements will effect the most comfortable position for any one operator's foot as he so desires. At the same time, the attachment, when attached to the pedal, will be rigidly affixed thereto whereas at the same time, the attachment may be released from its affixed position and imparted any one or several or all of the movements above described rapidly and easily to accommodate a different operators foot size position, etc.

A still further object of this invention resides in the accomplishment of the above objects by relatively simple and inexpensive means and incorporates the use of a specifically configurated foot rest strap which readily permits the vertical adjustment mentioned and which permits greater ease of installation than existing similar devices.

A further object of this invention resides in the provision of an improved foot rest for accelerator pedals wherein an elongate strap is provided at one end with an upstanding foot rest portion and at its opposite end with an upwardly directed loop which serves not only to act as a foot rest or stop but also to permit vertical adjustment of the opposite end of the strap with respect to the associated pedal.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

Figure 1 is a prospective view showing the attachment before it is assembled on an associated accelerated pedal:

Figure 2 is a plan view showing the attachment secured to an associated accelerator pedal and illustrating one position which the attachment may assume:

Figure 3 is a view similar to Figure 2 showing laterally angulated position of the attachment different from the position shown in Figure 2;

Figure 4 is a vertical section taken substantially along the plane of section line 4—4 in Fig. 2 illustrating the vertical adjustment or tilt permitted of the attachment.

With reference now most particularly to Fig. 1, the attachment is indicated generally by the reference character 10 and will be seen to be constructed preferably from an elongate metallic strap. The strap embodies an elongate flat central portion 11 which is adapted to accommodate the sole of an operators shoe between the stop assemblies indicated generally by the reference characters 12 and 13 at the opposite end of the intermediate portion 11. The stop portion 12 includes the relatively straight portion 14 extending angularly upwardly from its associated end of the intermediate portion 11 and terminates in a substantially horizontal tongue 15 in the manner shown. It is preferred that the portion 14 forms an obtuse angle with respect to the intermediate portion 11, the purpose of this construction being presently apparent.

The stop assembly 13 is formed by the upraised loop or U-shaped portion 16 having one face 17 thereof operating in conjunction with the opposed face of the portion 14 to confine an operators foot therebetween so as to rest upon the intermediate portion 11. The opposite leg 18 of the portion 16 extends below the intermediate portion 11 a substantial distance and terminates in an inwardly directed tongue or flange 19 which extends substantially parallel to the intermediate portion 11 and underlies this intermediate portion in part and it is directly below the inverted U-shaped portion 16. The flange 19 is provided substantially centrally thereof with a threaded opening through which the clamp bolt 20 projects presenting an upper end portion 21 adapted to engage the under surface of an accelerator pedal in a manner presently set forth. The low end of the clamp bolt 20 terminates in a head 22 for ready manipulation by means of pliers, a wrench or the like.

Secured to the undersurface of the intermediate portion 11 in spaced relation to the flange 19 is the U-shaped clamping assembly indicated generally by the reference character 23. This assembly incorporates an upper leg portion 24 which is rigidly secured to the undersurface of the intermediate portion 11 by means of welding as indicated by the reference character 25 or by any other suitable means. The bight 26 of the clamping member 23 is disposed vertically and depends from the intermediate portion 11 such that the lower leg 27 is disposed substantially parallel to the intermediate portion 11 and is directed toward the flange 19. This lower leg 27 is provided with a threaded opening for reception of the clamp screw 28 whose upper end 29 is adapted to engage the undersurface of an accelerator pedal and whose lower end terminates in a head 30 for manipulation of the clamping bolt.

It will be noted from Fig. 4 that the distance between the bight 26 of the clamping member 23 and the leg 18 of the opposed clamping assembly is greater than the width of the accelerator pedal 31. This permits lateral angular adjustments of the pedal attachment in the manner illustrated in Fig. 3 whereas at the same time the attachment may also be positioned in the manner shown in Fig. 2 or any desirable position. Actually, the position as shown in Fig. 2 is suitable in every instance wherein the heel of the shoe is placed directly upon or at the rear of the rear end 32 of the accelerator pedal whereas the position as shown in Fig. 3 is suitable when the heel of the shoe is placed laterally to one side of the rear portion 32 of the accelerator pedal 31.

The reason that the clamp bolt 20 is disposed in substantial vertical alignment with the highest portion of the inverted U-shaped member 16 is to permit this clamping bolt to act in such a manner as to elevate the stop portion 12 in the manner shown in Fig. 4. When such elevation is desired to be accomplished, the clamp bolt 28 is backed off and the clamp bolt 20 is screwed in such that it tends to move the portion 33 of the accelerator pedal into the area 34 defined by the U-shaped member 16, fulcruming the attachment about the point 35 which is the juncture point between the portion 13 and the intermediate portion 11. This action of the bolt 20 is continued until the desired tilt or vertical angular adjustment is attained whereafter the bolt 28 is brought into engagement with the undersurface of the accelerator pedal to rigidly affix the two member together. It will thus be noted that the manner of attaching the pedal attachment to the accelerator pedal may be such that three points of contact only are attained, this manner of securement being indicated most clearly in Fig. 4.

In this manner, the attachment may not only be moved longitudinally along the pedal 31 to the proper position but it also may be adjusted angularly with respect thereto as indicated in Fig. 3 and may further be adjusted angularly in the manner indicated in Fig. 4 such that all possible positions of an operator's foot can be accommodated. The position shown in Fig. 3 with the adjustment of Fig. 4 in addition thereto will very well serve to effect a natural resting place for the foot of those operators who dispose their heel to one side laterally of the heel portion 32 of the accelerator pedal 31. This is due to the fact that an accelerator pedal is normally so positioned that it is to one side of the operator and not directly in front of him necessitating not only the adjustment of Fig. 3 but also the adjustment of Fig. 4 such that substantially full contact is had between the operator's shoe sole and the intermediate portion 11 of the attachment.

The reason that the portion 14 is disposed at an obtuse angle to the intermediate portion 11 will be evident from Fig. 4. In such tilted positions of the attachment, it is desirable that the portoin 14 approach a right angular disposition with respect to the accelerator pedal but that at no time will it be disposed at an acute angle thereto. Thus, the portion 14 is disposed at a predetermined acute angle with respect to portion 11 so that throughout the normal range of adjustment, the above conditions will prevail.

I claim:

1. A foot rest attachment for accelerator pedals comprising an elongate strap having a flat intermediate portion and stop portions at its opposite ends, one of the stop portions extending angularly upwardly from its associated end of the intermediate portion, the other stop portion being of upraised, inverted U-shaped configuration having a substantially vertical free leg projecting below said intermediate portion, said free leg terminating in an inturned flange projecting substantially parallel to and in spaced relation below the associated end of said intermediate portion, a clamping bolt threadedly received through said flange and extending toward said other stop portion, a clamping member secured to the undersurface of said intermediate portion, said clamping member including a leg underlying said intermediate portion and extending toward said flange, and a second clamping bolt threadedly received in said leg and extending toward the undersurface of said intermediate portion.

2. A foot rest attachment for accelerator pedals comprising an elongate strap having a flat intermediate portion and stop portions at its opposite ends, one of the stop portions extending angularly upwardly from its associated end of the intermediate portion, the other stop portion being of upraised, inverted U-shaped configuration having a substantially vertical free leg projecting below said intermediate portion, said free leg terminating in an inturned flange projecting substantially parallel to and in spaced relation below the associated end of said intermediate portion, a clamping bolt threadedly received through said flange and extending toward said other stop portion, a clamping member secured to the undersurface of said intermediate portion, said clamping member including a leg underlying said intermediate portion and extending toward said flange, a second clamping bolt threadedly received in said leg and extending toward the undersurface of said intermediate portion, the first clamping bolt being disposed substantially in vertical registry with the uppermost portion of said other stop portion.

3. A foot rest attachment for accelerator pedals comprising an elongate strap having a flat intermediate portion and a stop portion at the opposite ends of the intermediate portion, one of the stop portions embodying a straight section projecting upwardly from the intermediate portion at an obtuse angle and terminating in a horizontal tongue, the other stop portion embodying an inverted U-shaped section having one leg connected to the intermediate portion and the other leg disposed vertically and projecting below the intermediate portion, said other leg terminating in an inturned flange paralleling the intermediate portion, said flange having a clamp bolt threadedly engaged therewith projecting vertically toward the uppermost portion of said U-shaped stop portion, a clamping member secured to the undersurface of said intermediate portion adjacent said one stop portion, said clamping member including a bight depending from the intermediate portion and terminating in a leg paralleling the intermediate portion and extending toward said flange, a second clamping bolt projecting through the last mentioned leg toward the undersurface of said intermediate portion.

4. A foot rest attachment for accelerator pedals comprising an elongate strap having a flat intermediate portion and a stop portion at the opposite ends of the intermediate portion, one of the stop portions embodying a straight section projecting upwardly from the intermediate portion at an obtuse angle and terminating in a horizontal tongue, the other stop portion embodying an inverted U-shaped section having one leg connected to the intermediate portion and the other leg disposed vertically and projecting below the intermediate portion, said other leg terminating in an inturned flange paralleling the intermediate portion, said flange having a clamp bolt threadedly engaged therewith projecting vertically toward the uppermost portion of said U-shaped stop portion, a clamping member secured to the undersurface of said intermediate portion adjacent said one stop portion, said clamping member including a bight depending from the intermediate portion and terminating in a leg paralleling the same and extending toward said flange, a second clamping bolt projecting through the last mentioned leg toward the undersurface of said intermediate portion, said last mentioned leg being disposed below and parallel to said flange.

5. A foot supporting or rest device for attachment to an accelerator pedal, comprising an elongate bar of a length to extend across and beyond the sides of an accelerator pedal to which it is to be attached, means at one end of the bar for receiving one side edge of the pedal when the bar is disposed across the top of the pedal, said means including a flange spaced below and directed toward the opposite end of the bar, a clamp bolt threaded through said flange toward the overlying bar, means secured to the underside of the bar and formed to receive the other side edge of the pedal, said last means including a leg spaced below the underside of the bar and directed toward the end of the bar carrying the first means, said leg being spaced a materially greater distance from the underside of the bar than said flange, a clamp screw threaded through said leg toward the bar, and a fulcrum forming means for supporting the bar on the pedal at a location lying in a plane extending across the bar between said bolt and screw.

6. The invention according to claim 5 wherein the second mentioned means is located substantially midway between the ends of the bar.

7. The invention according to claim 5, with an upstanding stop means at the said opposite end of the bar.

8. The invention according to claim 5, with upstanding stop means at and forming extended portions of the bar at its ends.

9. The invention according to claim 5, wherein the first means includes an upraised loop extension of a portion of the bar providing a stop, and said fulcrum forming means being provided by an angle formed by one side of the loop and the end portion of the bar which it joins.

References Cited in the file of this patent
UNITED STATES PATENTS

| | | |
|---|---|---|
| 1,152,257 | Young | Aug. 31, 1915 |
| 1,388,935 | De Tamble | Aug. 30, 1921 |
| 2,651,944 | Schetzer | Sept. 15, 1953 |